(12) United States Patent
Radford et al.

(10) Patent No.: US 11,729,471 B2
(45) Date of Patent: Aug. 15, 2023

(54) AUTOMATIC AUDIO SOURCE SELECTION SYSTEM

(71) Applicant: ROKU, INC., San Jose, CA (US)

(72) Inventors: Sheldon Thane Radford, Palo Alto, CA (US); Sahiba Johar, Santa Clara, CA (US); Alistair Rodger, Cambridge (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/076,296

(22) Filed: Oct. 21, 2020

(65) Prior Publication Data

US 2021/0152890 A1 May 20, 2021

Related U.S. Application Data

(63) Continuation of application No. 16/689,556, filed on Nov. 20, 2019, now Pat. No. 10,848,829.

(51) Int. Cl.
| | | |
|---|---|---|
| *H04N 21/47* | (2011.01) | |
| *H04R 3/12* | (2006.01) | |
| *H04N 21/422* | (2011.01) | |
| *H04N 21/485* | (2011.01) | |

(52) U.S. Cl.
CPC ....... *H04N 21/47* (2013.01); *H04N 21/42204* (2013.01); *H04R 3/12* (2013.01); *H04N 21/4221* (2013.01); *H04N 21/485* (2013.01); *H04R 2420/01* (2013.01)

(58) Field of Classification Search
CPC ............. H04N 21/47; H04N 21/42204; H04N 21/485; H04N 21/4221; H04N 21/43615; H04N 21/4852; H04N 21/4104; H04N 21/43635; H04N 5/44513; H04N 5/4403; H04N 2005/4412; H04N 2005/44517;

(Continued)

(56) References Cited

U.S. PATENT DOCUMENTS 10,848,829 B1 11/2020 Radford et al.
2005/0063404 A1* 3/2005 Karaoguz ........ H04N 21/43615
370/418

(Continued)

OTHER PUBLICATIONS

"Boost TV Compact TV Speaker," printed Nov. 15, 2019 from https://www.jbl.com/BOOSTTV.html, 12 pages, Copyright 2019, Harman International Industries, Inc.

*Primary Examiner* — Michael E Teitelbaum
(74) *Attorney, Agent, or Firm* — Sterne, Kessler, Goldstein & Fox P.L.L.C.

(57) ABSTRACT

System, method, and various embodiments for providing an automatic audio source selection system are described herein. An embodiment operates by determining a state of a first device configured to output first video to a screen and first audio to one or more speakers. A priority of the first device is determined relative to one or more other devices configured to output second video to the screen and second audio to the one or more speakers. An audio source for the one or more speakers is selected based on both the state of the first device and the priority of the first device. Based on the selected audio source, audio is provided to the one or more speakers for output, wherein the output audio corresponds to video output to the screen from the selected audio source.

21 Claims, 5 Drawing Sheets

(58) Field of Classification Search
CPC ........ H04R 3/12; H04R 2420/01; H04R 5/04; H04R 2499/15
See application file for complete search history.

(56) References Cited

U.S. PATENT DOCUMENTS

| | | | |
|---|---|---|---|
| 2007/0298656 A1* | 12/2007 | He | H01R 29/00 439/607.01 |
| 2008/0218634 A1 | 9/2008 | Chang et al. | |
| 2011/0230137 A1 | 9/2011 | Hicks et al. | |
| 2013/0121666 A1* | 5/2013 | Furuya | H04N 21/440263 386/248 |
| 2015/0103253 A1* | 4/2015 | Higuchi | H04N 21/8106 348/705 |
| 2017/0193962 A1* | 7/2017 | Yoon | G06F 3/147 |
| 2017/0228213 A1 | 8/2017 | Kim et al. | |
| 2017/0235461 A1* | 8/2017 | Oh | G06F 3/165 715/716 |
| 2018/0109837 A1* | 4/2018 | Sprenger | H04N 21/47217 |

* cited by examiner

AUTOMATIC AUDIO SOURCE SELECTION SYSTEM

CROSS-REFERENCE TO RELATED APPLICATIONS

This application is a continuation of U.S. patent application Ser. No. 16/689,556 titled "Automatic Audio Source Selection System," filed Nov. 20, 2019, which is herein incorporated by reference in its entirety.

TECHNICAL FIELD

This disclosure generally relates to automatically selecting audio sources.

BACKGROUND

Televisions generally have their own built-in speaker system which can be used by a user to listen to the sound of whatever is being watched on television. However, these built-in speaker systems are often limited in their capabilities to produce high-quality sounds, or create a theatre-type or stadium-type audio experience a user may desire. As such, many people connect additional sound equipment (e.g., stereos, speakers, sound bars, etc.) to enhance the audio quality of their experience. However, coordinating the video and the audio can then become problematic for users to make sure both the television and additional sound equipment are tuned to the proper channels at the same time.

SUMMARY

Various embodiments are described throughout this specification. This disclosure is not limited to the summary provided herein.

An example embodiment may include a method. In an embodiment, at a speaker device, a first audio is received from a media player, and a television is configured to output video corresponding to the first audio from the media player. A change of a state of the media player indicating that the first video is no longer to be output by the television is detected by the speaker device. An audio source from which audio is being received from the first audio of the media player is automatically updated to receive second audio from the television. The second audio from the television is automatically output, responsive to the automatic update, by the speaker device.

Another embodiment may include a system. The system includes a memory and one or more processors coupled to the memory. The one or more processors are configured to perform various operations. In an embodiment, at a speaker device, a first audio is received from a media player, and a television is configured to output video corresponding to the first audio from the media player. A change of a state of the media player indicating that the first video is no longer to be output by the television is detected by the speaker device. An audio source from which audio is being received from the first audio of the media player is automatically updated to receive second audio from the television. The second audio from the television is automatically output, responsive to the automatic update, by the speaker device.

Another embodiment may include a non-transitory computer-readable device having instructions stored thereon. In an embodiment, at a speaker device, a first audio is received from a media player, and a television is configured to output video corresponding to the first audio from the media player. A change of a state of the media player indicating that the first video is no longer to be output by the television is detected by the speaker device. An audio source from which audio is being received from the first audio of the media player is automatically updated to receive second audio from the television. The second audio from the television is automatically output, responsive to the automatic update, by the speaker device.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing an automatic audio source selection system.

Televisions generally have their own built-in speaker system which can be used by a user to listen to the sound of whatever is being watched on television. However, these built-in speaker systems are often limited in their capabilities to produce high-quality sounds, or create a theatre-type or stadium-type audio experience a user may desire. As such, many people connect additional sound equipment (e.g., stereos, speakers, sound bars, etc.) to enhance the audio quality of their experience. However, coordinating the video and the audio can then become problematic for users to make sure both the television and additional sound equipment are tuned to the proper channels at the same time.

Figure 1:
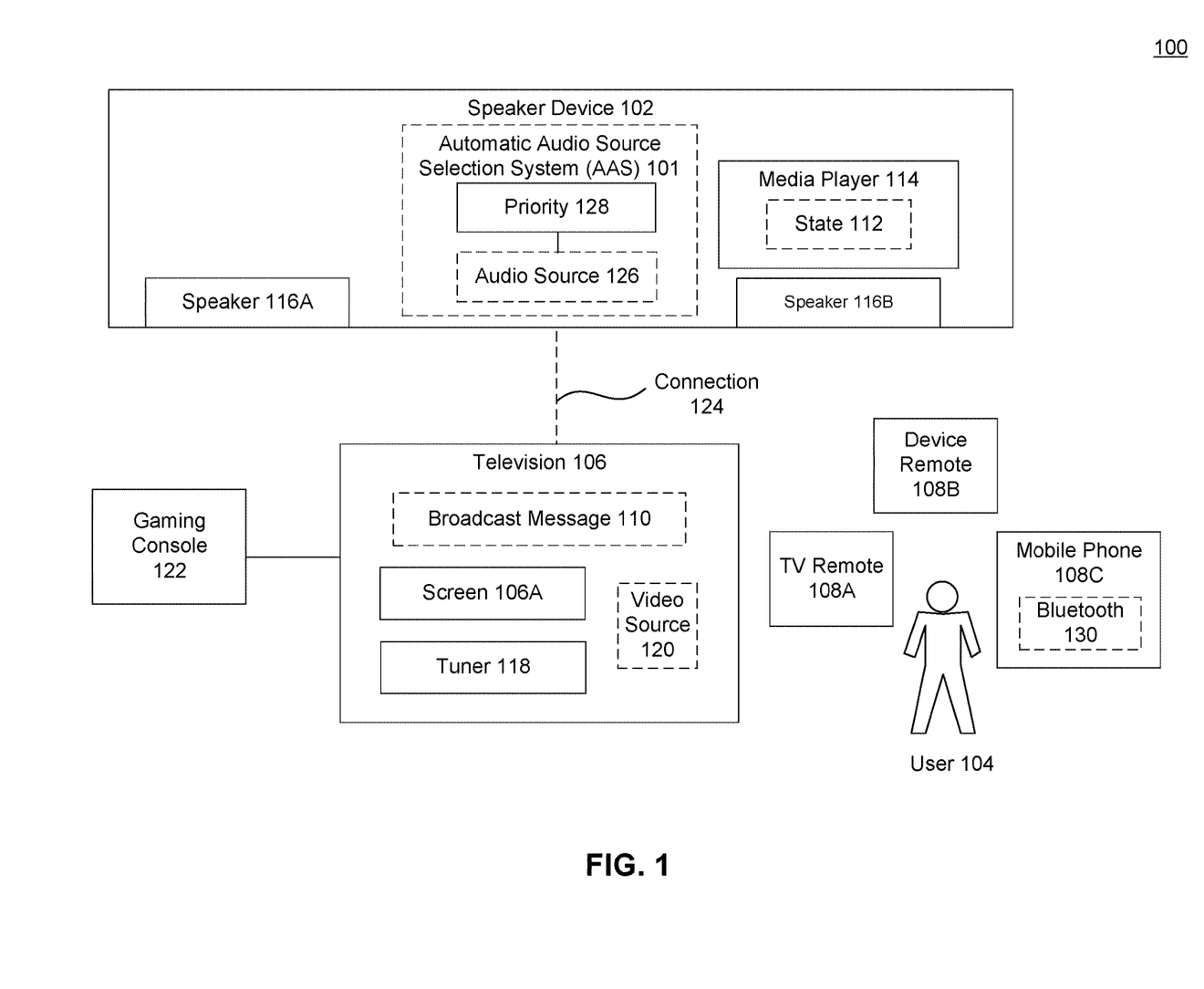
FIG. 1 is a block diagram illustrating example functionality for providing an automatic audio source selection system (AAS), according to some embodiments.

FIG. 1 is a block diagram 100 illustrating example functionality for providing an automatic audio source selection system (AAS) 101, according to some embodiments. Rather than requiring a user 104 to manually select or set an input selection or channel selection for both the video being displayed on a first device and the audio being output through a second device, AAS 101 may automatically set the audio to correspond to video selections made by the user 104.

For example, user 104 may set a video source 120 on a television 106 (which may be used to output video), then AAS 101 (as may be integrated within speaker device 102) may automatically (e.g., without user 104 intervention) select the audio input channel or audio source 125 corresponding to whatever is being displayed on the television 106, so that the video and audio are automatically coordinated. As is described in greater detail below, AAS 101 may receive commands from remote controls or other wireless devices 108, broadcast messages 110 from the television 106, and/or query or receive updates about the state 112 of a media player 114, to determine which audio source 126 to select.

Television 106 may be a television set (including a SMART television or analog television), projector, monitor, or other device capable of producing video output. In an embodiment, television 106 may include or be connected to a tuner 118 and include a screen 106A on which the video is output.

Tuner 118 may be an internal or external tuner, including an antenna, through which television receives television channels or signals. In an embodiment, tuner 118 may include a cable box or satellite box through which the television channels are received on screen 106A. In an embodiment, screen 106A may be any display unit, and may include a touchscreen. In an embodiment, screen 106A may include a projector screen onto which the video is output. Though not shown, television 106 may include its own internal audio or speaker system through which sound (corresponding to whatever is being displayed on the screen 106A) may be audibly output for a user 104.

In an embodiment, television 106 may output whatever video that corresponds to a selected video source 120 to screen 106A. Video source 120 may be an input channel (wired or wireless) indicating which of the possible video inputs a user 104 wants to display on screen 106A. In an embodiment, video source 120 may include inputs corresponding to tuner 118, a gaming console 122, a media player 114 (which may include various streaming apps through which video content is streamed), or a mobile phone 108C.

In an embodiment, user 104 may use a TV remote 108A to select or change the video source 120 from which television 106 is receiving and/or outputting video content. Example input source selections include, but are not limited to: HDMI1, HDMI2, Tuner, Cable, Satellite, and Auxiliary. In an embodiment, gaming console 122 may be connected to an HDMI2 port on television 106 using an HDMI (high definition multimedia interface) cable, speaker device 102 may be connected over connection 124 using the HDMI1 port, and mobile phone 108C may be wirelessly connected to television 106.

In other embodiments, video source 120 may correspond to or allow other inputs as well, such as internet videos, a DVD player, a camera input, etc. Each of these devices or video inputs may be either wired or wirelessly coupled to television 106, such that television 106 is configured to receive at least a video stream of images/video to output on screen 106A. In some embodiments, the connections may also allow audio input to be received by television 106.

Television 106 may be communicatively coupled to speaker device 102 by a wired or wireless connection 124. In an embodiment, connection 124 may be an HDMI connection (e.g., using an HDMI cable), an optical wire connection, or a wireless connection, such as WIFI or Bluetooth. In other embodiments, other types of connections may also be used.

Connection 124 may enable audio from television to be received by speaker device 102. So, for example, if tuner 118 is being used to watch a football game, then speaker device 102 may receive the audio of the football game over connection 124 and output the audio via speakers 116A, 116B. In an embodiment, connection 124 may enable video to be output from speaker device (or media player 114) to television 106 (onto screen 106A), and may be selectable as one possible video source 120.

Similar to how television 106 has a video source 120 option, so too may speaker device 102 include an audio source 126 option. Audio source 126 may indicate from which input source or audio channel speaker device 102 (which may be a sound bar device) is to receive audio. Speaker device 102 may then output the received audio via speakers 116A, 116B (which may include built-in, wired, and/or wireless speakers). In an embodiment, speakers 116 may include a separate subwoofer device (not shown).

In a conventional television and sound system setup, a user may need to manually set both the video input on their television and the audio input on their sound bar or other audio system. If these selections are not coordinated, the user could end up with video from one source and audio from a different source. However, with the multitude and varying and changing names and possible video and audio channels available, requiring a user to coordinate both the video and audio input channels can be time consuming, difficult, and degrade the user experience. For example, the user may have trouble remembering which audio channel corresponds to which video channel, and may require the user to use multiple different remote controls to make the selections.

AAS 101 may alleviate these and other problems, by automatically making audio source selections 126 based on user 104 selections of video sources 120. In an embodiment, AAS 101 may detect input and/or the states of various devices connected to speaker device 102 to determine which audio source 126 to select. As referenced above, AAS 101 may be integrated into the processing logic or executable by the processors of speaker device 102.

In an embodiment, speaker device 102 may be communicatively coupled to media player 114. In an embodiment, media player 114 may be a streaming media player such as a ROKU device, APPLE TV, or GOOGLE CHROMECAST device. Media player 114 may provide access to any various multimedia input directly or indirectly through the user of various apps. Example multimedia apps include, but are not limited to, NETFLIX, PRIME VIDEO, HULU, and YOUTUBE.

Media player 114, as illustrated, may be built-in to the speaker device 102 and accessible using the same device remote 108B used to operate speaker device 102, which may be a sound bar, DVD player, or other stereo or audio output device. In another embodiment, media player 114 may be an external media player that is either wired or wirelessly coupled to speaker device 102. In an embodiment, media player 114 may be a selectable channel as video source 120 and video may be streamed over connection 124 to television 106 for video and/or audio output. In an embodiment, only video may be streamed from media player 114 to television 106, while audio is streamed directly to AAS 101 (and is not output from any built-in television 106 speakers).

In an embodiment, AAS 101 may include a priority list or priority indicator 128 that indicates a default audio source 126, and/or an order in which the audio from the devices are to be output depending on their states or the input commands. For example, priority 128 may indicate that if media player 114 is actively playing or streaming content, then media player 114 may be the selected audio source 126. However, if media player is stopped or powered off, then television 106 may be the default or selected audio source 126.

In an embodiment, AAS 101 may detect, request, or determine the state 112 of media player 114 to determine which audio source 126 to select as the active audio input or channel (without user 104 intervention or a purposeful, direct, or deliberate selection of audio source 126 by user 104). State 112 may be an indicator that indicates a state as to what, if anything is being output from media player 114 (to television 106). In an embodiment, state 112 may indicate whether media player is playing (e.g., streaming video and/or audio or other multimedia content to television 106). State 112 may also indicate whether a home screen is being output, whether a rewind/forward/pause command has been or is being processed or executed, or whether there is no output. In an embodiment, state 112 may include a power on or power off signal from media player 114 indicating that a power command has been received from user 104.

As indicated above, the combination of state 112 and priority 128 may determine which audio source 126 is selected for audio input (and output via speakers 116A, 116B). If, for example, AAS 101 determines that the state of media player 114 is active or playing, then AAS 101 may automatically adjust or set audio source 126 of speaker device 102 to receive audio content from media player 114. If however, state 112 is inactive or no response to a query is received about state 112 (indicating a power off state), then audio source 126 may be set to television 106.

In an embodiment, media player 114 may be assigned a higher priority than television 106 in terms of audio output via speaker device 102. So if state 112 is playing or active, then audio from media player 114 may be output without trying to verify a state or most recent command regarding television 106.

However, AAS 101 may update audio source 126 based on an updated state or command of media player 114 or television 106. For example, a user 104 may initially be watching video from media player 114 on television 106 (which is also selected as audio source 126). User 104 may then use TV remote 108A to change the video input or source 120 to watch the basketball game from tuner 118. Upon receiving the input or channel change command from TV remote 108A, television 106 may send a broadcast message 110 indicating a change of state of the television 106.

In an embodiment, commands received by television 106 from TV remote 108A (or by user 104 manually adjusting settings on television 106 without the use of TV remote 108A), may result in television sending out a status change or broadcast message 110. In an embodiment, broadcast message 110 may be a signal that is transmit by television 106 to any connected devices which may be configured to receive the message 110, which may be in accordance with a protocol.

For example, broadcast message 110 may be a CEC (Consumer Electronics Control) message that is transmit over any HDMI ports of television 106 to any HDMI connected devices. Message 110 may be transmitted and received by both speaker device 102 and gaming console 122 over HDMI ports. While gaming console 122 may ignore or take no action on the message 110, speaker device 102 may update the audio source 126 based on broadcast message 110.

For example, as noted above, if message 110 indicates that video source 120 has been updated (e.g., from media player 114 to tuner 118 or to gaming console 122), then an indication of the change in the state of television may be broadcast, multicast, or unicast as message 110. Then for example, if audio source 126 is not already set to television 106, audio source 126 may be updated (and set to television 106).

In an embodiment, television 106 may transmit over connection 124 any audio that is being received from any device connected directly to television 106. For example, if user 104 activates the gaming console 122 to watch a movie or play video games, the audio for the video games may be received by television 106 over an HDMI connection and then transmit to speaker device 102 and output via speakers 116A, 116B while the audio source 126 is set to television. The audio from the gaming console 122 may or may not also be output via the television's own internal speaker systems. If a user changes the input channel of video source 120 from gaming console 122 to tuner 118, AAS 101 may receive a message 110 but take no action if audio source 126 is already set to television 106.

However, user 104 who was playing gaming console 122 (with audio source 126 set to television), changes video source 120 to media player 114 (or otherwise activates media player 114 by pressing the play button on a device remote 108B) then AAS 101 may receive broadcast message 110 from television 106 and/or an updated state 112 notification from media player 114, and may accordingly update audio source 126 to media player 114.

As indicated above, TV remote 108A may be a remote control or device used to operate television 106. Using TV remote 108A, user 104 may adjust audio settings for the built-in speaker system of television 106, change video settings such as brightness, contrast, hue, operate menus of television 106, and/or change video source 120.

Device remote 108B may enable user 104 to operate speaker device 102 and/or media player 114. Device remote 108B may enable user to select from various sound settings (theatre, stadium, stereo, surround, etc.), change audio settings, navigate visual interface menus, and select or override automatic audio source 126 selections. In another embodiment, device remote 108B may not include any options for audio source 126 selection. In another embodiment, media player 114 may include its own separate remote control, or may be operated by TV remote 108A (e.g., if television 106) is a SMART television with its own built-in or installed media player 114.

As illustrated, user 104 may be operating a mobile phone 108C. Mobile phone 108C may include any mobile device, including for example a tablet, phone, or laptop computer that may be used to stream audio and/or video to speaker device 102 and/or television 106 over a wired or wireless connection. In an embodiment, mobile phone 108C may include Bluetooth 130 or other wireless technology (including WIFI) over which mobile phone 108C is communicatively coupled to speaker device 102 and/or television 106. Mobile phone 108C may stream multimedia from apps or the Internet or other files over the wireless or Bluetooth 130 connection.

In an embodiment, priority 128 may indicate that if there is an active Bluetooth 130 connection to a mobile phone 108C over which data is being received, then audio source 126 may be set to output the audio data being received over the Bluetooth connection. In an embodiment, this may occur regardless of the state 112 of media player 114. For example, television 106 may be displaying video from media player 114 and audio source 126 may be set to media player 114. Then, for example, if AAS 101 detects that user 104 begins streaming data over a Bluetooth connection, AAS 101 may update audio source 126 to the Bluetooth connection, resulting in video source 120 being set to media player 114 and audio source 126 to Bluetooth connection.

In an embodiment, Bluetooth connection may be an input channel. So, for example, a user 104 may be streaming NETFLIX using an internal media player 114. If the user 104 then begins streaming over Bluetooth, speaker device 102 may automatically stop the NETFLIX application and launch a Bluetooth application by which to receive content.

Or for example, user 104 may be watching television 106 in which the video source 120 is set an antenna or tuner 118. Then, for example, upon detecting audio being received over a Bluetooth connection 130, AAS 101 may receive and output the Bluetooth audio. As such, user 104 may be simultaneously viewing video from tuner 118 and hearing audio content received over Bluetooth 130 from mobile phone 108C.

In another embodiment, priority 128 may indicate that state 112 takes priority over Bluetooth, such that if state 112 is actively outputting video data to television 106, audio source 126 may remain set to media player 114 even if new activity is detected over a Bluetooth connection.

Figure 2A:
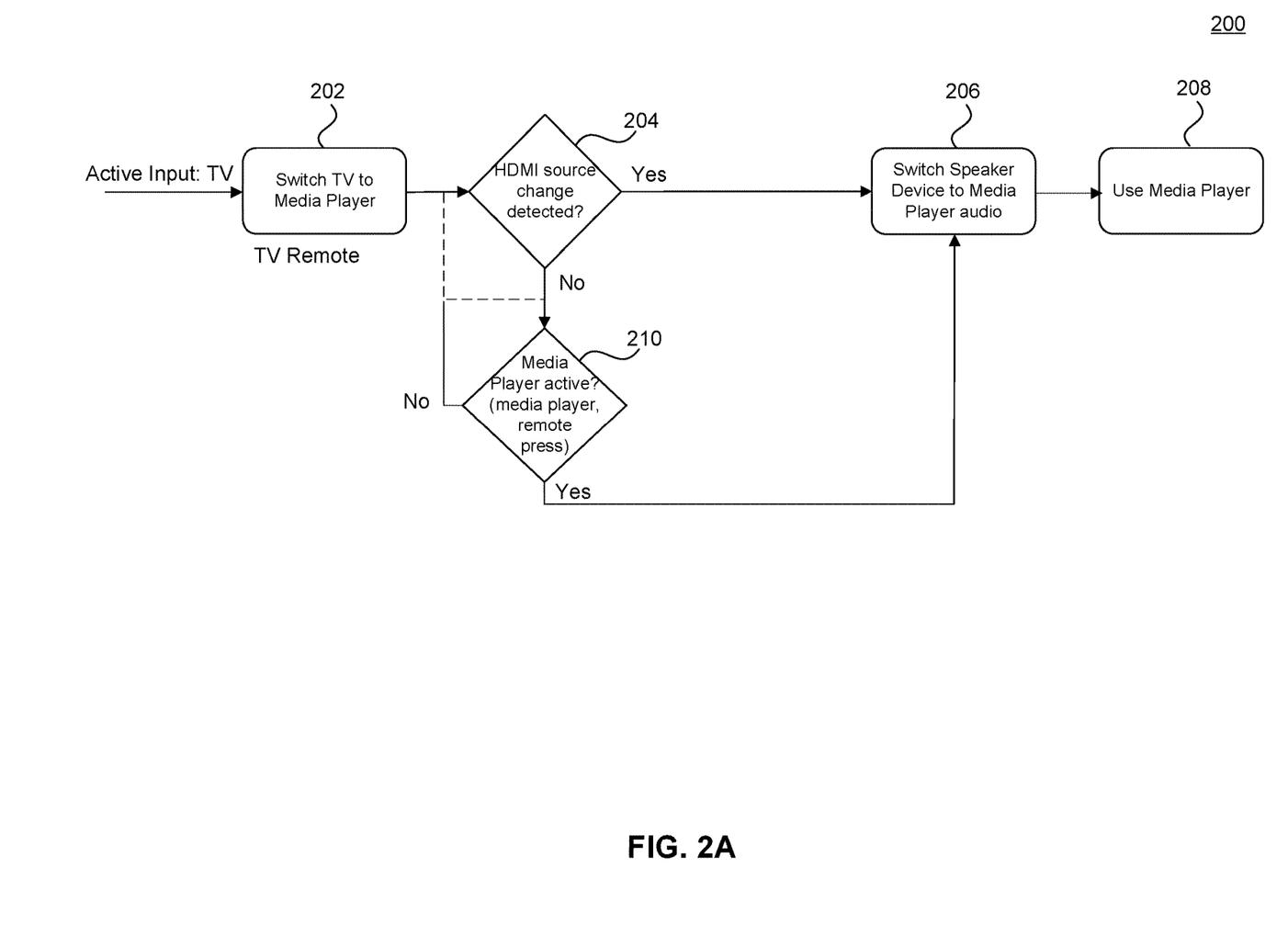
FIG. 2A illustrates example operations related to automatically switching an audio source from a television to a media player by an AAS, according to an embodiment.

FIG. 2A illustrates example operations 200 related to automatically switching audio source 126 from television 106 to media player 114, according to an embodiment. In the example illustrated, the audio source 126 may initially be set to receiving and outputting audio from television 106. At 202, television 106 may receive a command from TV remote 108A to switch video source 120 to media player 114. For example, user 104 may select the HDMI input channel corresponding to media player 114/speaker device 102.

Television 106 may transmit a broadcast message 110 over the HDMI ports indicating the request responsive to change the video source 120 at 202. At 204, AAS 101 may receive broadcast message 110 and detect the change of video source 120. At 206, AAS 101 may update audio source 126 to media player 114. At 208, user 104 may operate media player 114 using a device remote 108B (e.g., navigating menus, selecting content to play/rewind/forward, etc.).

In an embodiment, if there was no broadcast command or message 110 recently received, AAS 101 may periodically query or check the state 112 of media player 114. If the state 112 is active (e.g., powered on or playing media) then AAS 101 may update or maintain audio source 126 on media player 114. If, however, state 112 indicates that media player 114 is inactive, paused, not streaming video, or turned off, then AAS 101 may wait until a broadcast command or message 110 is received or state 112 is updated to change audio source 126 to media player 114.

Figure 2B:
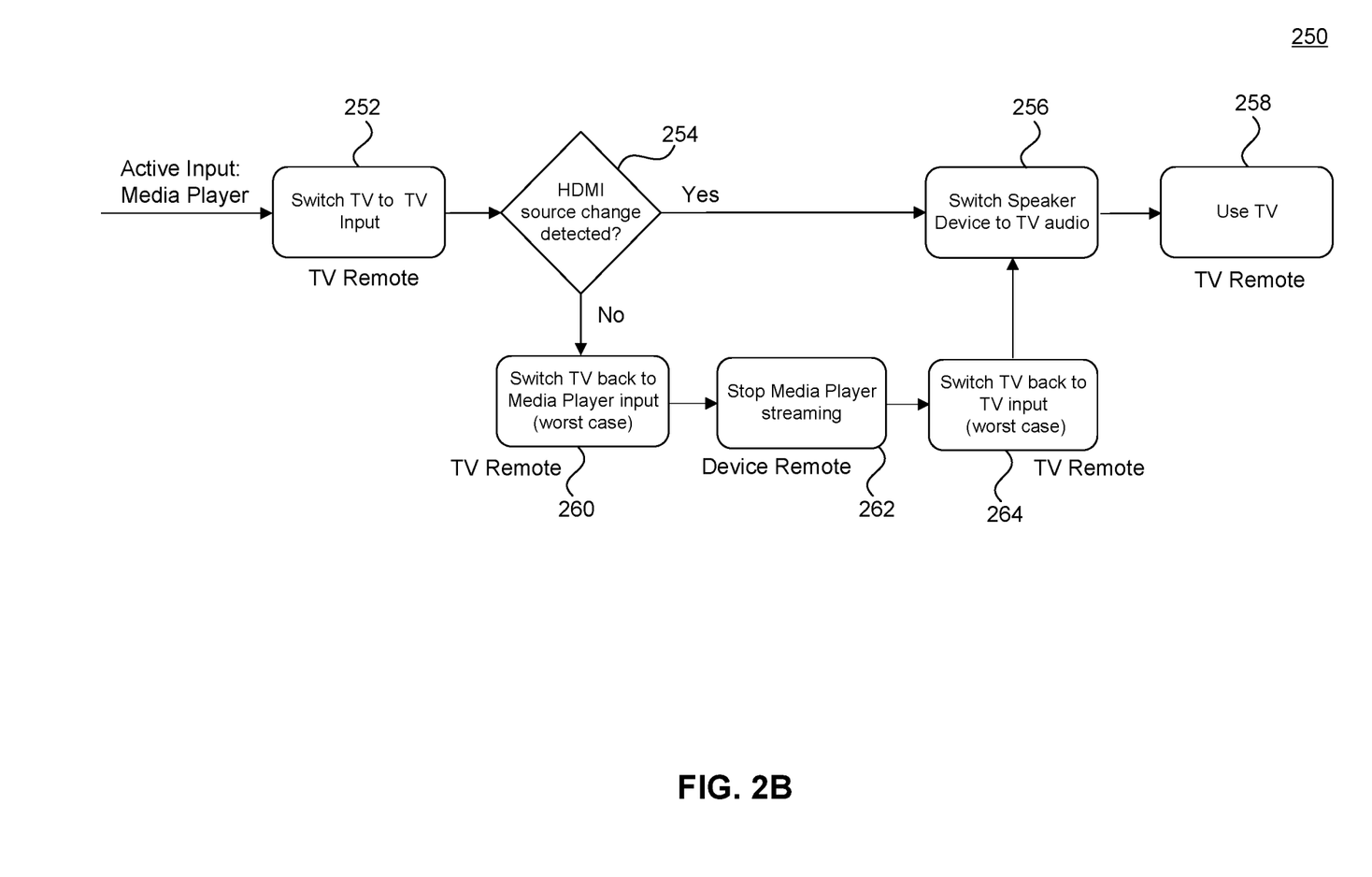
FIG. 2B illustrates example operations related to automatically switching from a media player to another audio source by an AAS, according to an embodiment

FIG. 2B illustrates example operations 250 related to automatically switching from media player 114 to another audio source, according to an embodiment. In the example illustrated, the audio source 126 may initially be set to receiving and outputting audio from media player 114. In an embodiment, at 252, television 106 may receive a change to video source 120 from media player 114 to another input (e.g., such as gaming console 122 or tuner 118).

Responsive to the video source 120 change request, speaker device 102 may receive broadcast message 110 from television 106 (indicating the video source 120 change), at 254. At 256, upon receiving this message 110, AAS 101 may switch audio source 126 to television 106. Speaker device 102 may then receive and output the corresponding audio for whatever device or video source 120 is selected. At 258, using TV remote 108A, user 104 may then operate television 106 (or gaming console 122) as usual.

If broadcast message 110 is not detected (e.g., because television is too old, does not support broadcast messages 110, or not connected to speaker device 102 over an HDMI connection), then television 106 may be set to the newly requested video source (such as gaming console 122) while audio source 126 remains on media player 114.

To correct this circumstance of a misalignment between audio source 126 and video source 120, a user 104 may use TV remote 108A to switch video source 120 back to media player 114 as the video input channel. At 262, using device remote 106B, user 104 may press the "Stop" or "power" commands to turn off the streaming video from media player 114. Or, for example, a user may select a "Home" button which may cause a return to a home screen and may pause or stop the streaming media player 114. This selection may cause state 112 to be updated.

AAS 101 may then be updated or periodically request state 112 updates. This change of state 112 may cause AAS 101 to update audio source 126 to its default source of television 106. User 104 may then use TV remote 108A to switch video source 120 back to gaming console 122. In another embodiment, pressing stop on the device remote 108B (262) may be sufficient to cause audio source 126 to update, without user 104 performing steps 260 or 264.

Figure 3:
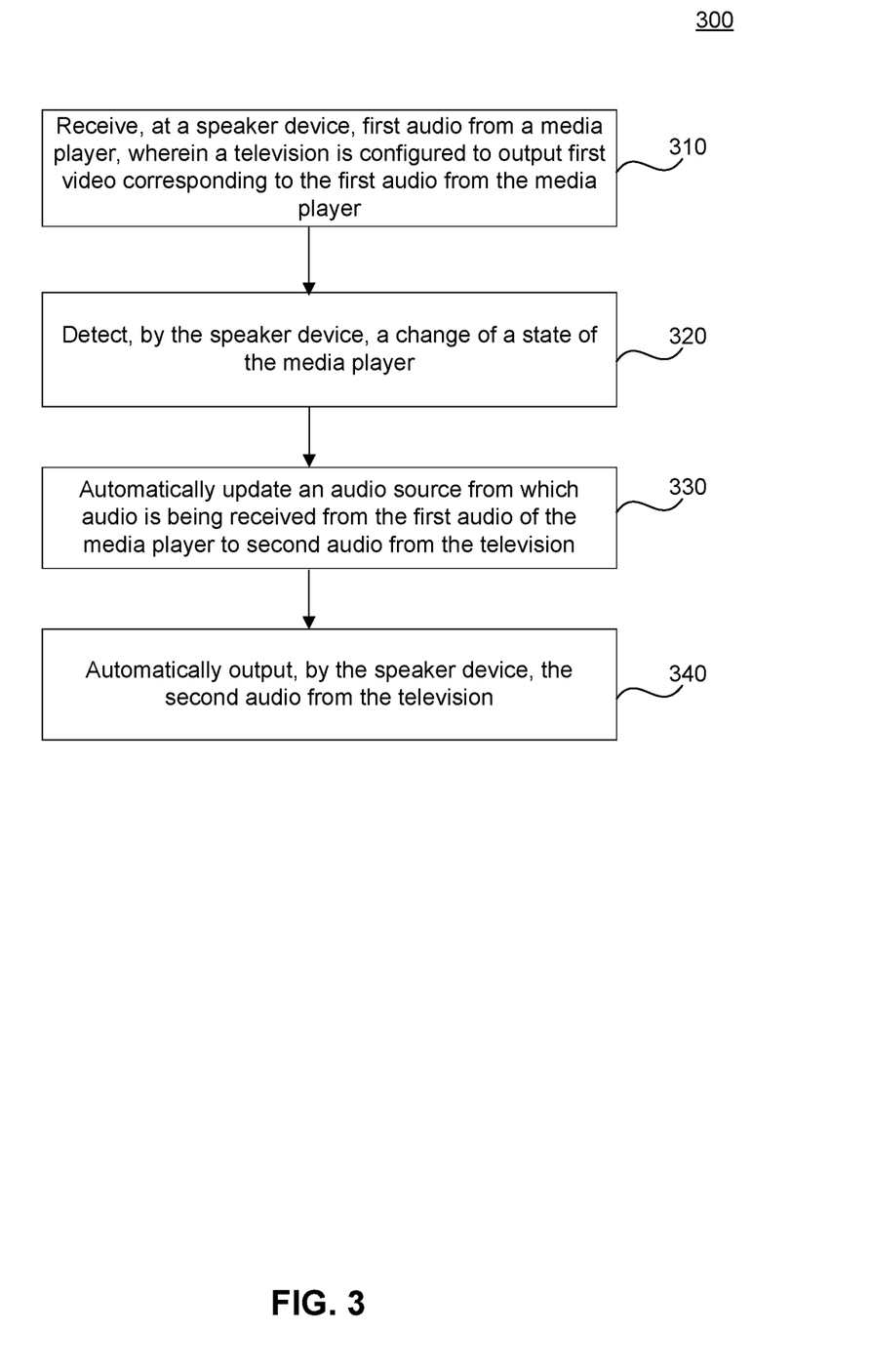
FIG. 3 is a flowchart illustrating example operations for providing an automatic audio source selection system, according to some embodiments.

FIG. 3 is a flowchart illustrating example operations for providing an automatic audio source selection system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, first audio is received at a speaker device from a media player, wherein a television is configured to output first video corresponding to the first audio from the media player. For example, speaker device 102 may be a sound bar that has a built-in streaming media player 114. The streaming media player 114 may be executing an app, such as NETFLIX, that is transmitting video to television 106 and audio is being output through speakers 116A, 116B connected to the sound bar or speaker device 102.

In 320, a change of a state of the media player is detected by the speaker device. For example, the user 104 may hit a "STOP" button on the device remote 108B to stop the streaming movie (from media player 114) that the user is watching on television 106. The stop button could cause the media player 114 to return to a home screen or navigation menu, which may or may not have sound.

In 330, an audio source from which audio is being received is automatically updated from first audio of the media player to second audio from the television. For example, if the user 104 hits the "STOP" button, then media player 114 may update state to indicate whether any sound is being output on the home screen or navigation screen. If there is sound that may be output (such as menu selection or navigation sounds, or previews of shows or movies), then audio source 126 may remain set to media player 114. However, a home command selection may cause AAS 101 to change audio source 126 from media player 114 to television 106. Or for example, a broadcast message 110 received from television 106 may cause AAS 101 to automatically update the audio source 126 to television 106.

In 340, the second audio from the television is automatically output by the speaker device responsive to the automatic update. For example, when audio source 126 is updated to television 106, then audio from television 106 (including gaming console 122 and/or tuner 118) may be received over connection 124 and output via speakers 116A, 116B, while the corresponding video is output to screen 106A.

Figure 4:
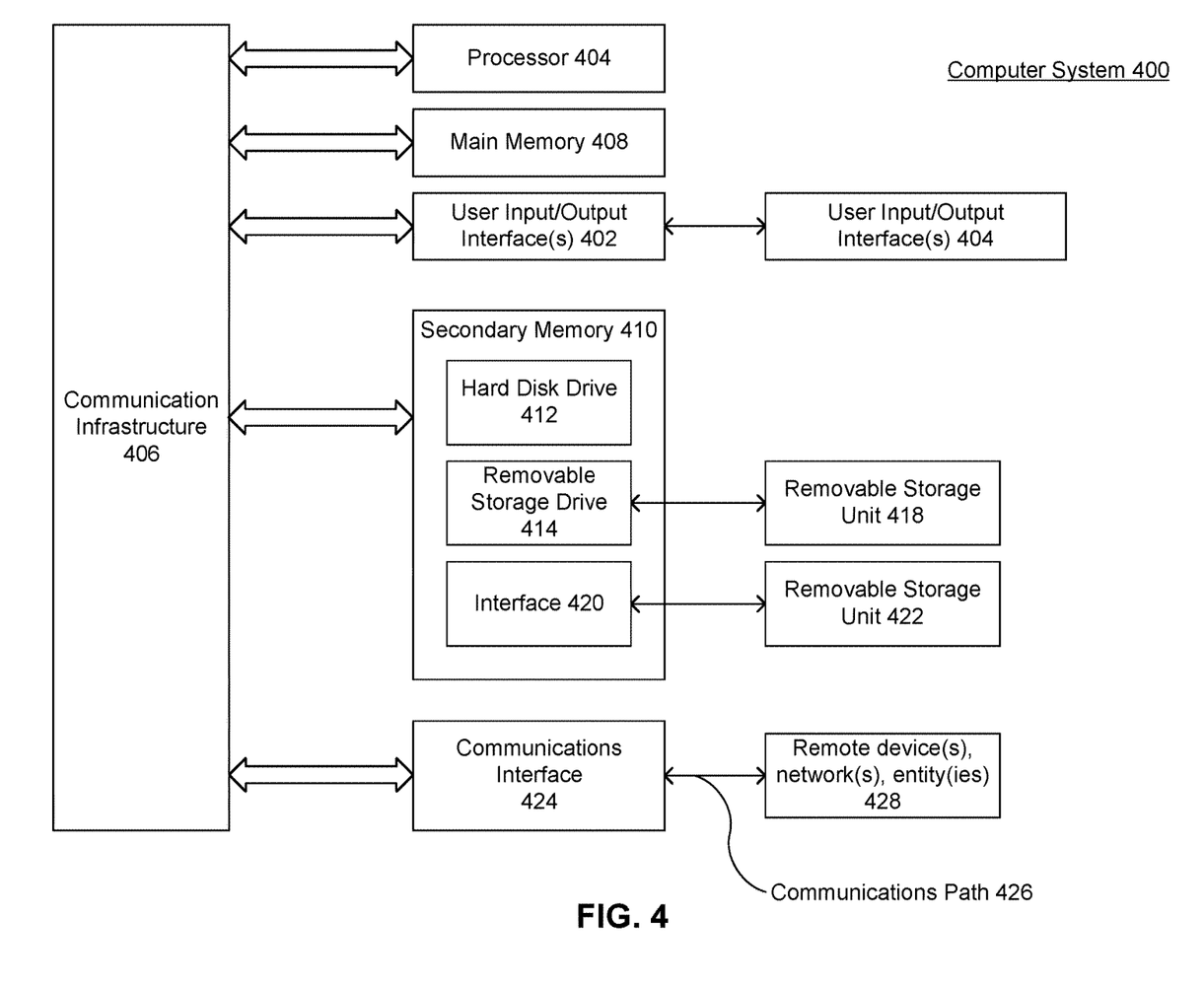
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining a state of a first device configured to output first video to a screen and first audio to one or more wireless speakers, wherein the one or more wireless speakers are configured to receive and output audio from an audio source different than from a video source from which the first video is received and output;
   determining a priority list indicating an order in which audio from one or more devices, including both the first device and a second device, are output to the one or more wireless speakers, wherein the audio output from the one or more devices is received independently of the video;
   detecting a change in the state of the first device;
   selecting the second device as an audio source for the one or more wireless speakers based on both the change in the state of the first device and the priority list; and
   providing, based on the selected audio source, audio to the one or more wireless speakers for output, wherein the output audio corresponds to video output to the screen from the selected audio source.

2. The method of claim 1, wherein the first device comprises a media player, and wherein one of the one or more other devices comprises a television including the screen, wherein both the media player and the television are configured to provide audio to the one or more wireless speakers.

3. The method of claim 2, wherein a state of the media player indicates that video is being output to the television, and wherein the selected audio source comprises the media player.

4. The method of claim 2, wherein a state of the media player indicates that no video is being output.

5. The method of claim 4, further comprising:
   determining that the media player has a greater priority than the television; and
   selecting the television as the audio source.

6. The method of claim 2, wherein the detecting the change comprises receiving a message from the television indicating that a video source for the television has changed; and
   wherein the selecting the second device comprises selecting a new audio source based on the message, wherein the television is configured to output video via the screen corresponding to the selected new audio source.

7. The method of claim 2, further comprising:
   receiving a broadcast message over a high definition multimedia interface (HDMI) port of the television.

8. A system comprising:
   a memory; and
   at least one processor coupled to the memory and configured to perform operations comprising:
   determining a state of a first device configured to output first video to a screen and first audio to one or more wireless speakers, wherein the one or more wireless speakers are configured to receive and output audio from an audio source different than from a video source from which the first video is received and output;
   determining a priority list indicating an order in which audio from one or more devices, including both the first device and a second device, are output to the one or more wireless speakers, wherein the audio output from the one or more devices is received independently of the video;
   detecting a change in the state of the first device;
   selecting the second device as an audio source for the one or more wireless speakers based on both the change in the state of the first device and the priority list; and
   providing, based on the selected audio source, audio to the one or more wireless speakers for output, wherein the output audio corresponds to video output to the screen from the selected audio source.

9. The system of claim 8, wherein the first device comprises a media player, and wherein one of the one or more other devices comprises a television including the screen, wherein both the media player and the television are configured to provide audio to the one or more wireless speakers.

10. The system of claim 9, wherein a state of the media player indicates that video is being output to the television, and wherein the selected audio source comprises the media player.

11. The system of claim 9, wherein a state of the media player indicates that no video is being output.

12. The system of claim 11, wherein the operations further comprise:

determining that the media player has a greater priority than the television; and selecting the television as the audio source.

13. The system of claim 9, wherein the detecting the change comprises receiving a message from the television indicating that a video source for the television has changed; and wherein the selecting the second device comprises selecting a new audio source based on the message, wherein the television is configured to output video via the screen corresponding to the selected new audio source.

14. The system of claim 9, wherein the detecting the change comprises receiving a broadcast message received over a high definition multimedia interface (HDMI) port.

15. A non-transitory computer-readable medium having instructions stored thereon that, when executed by at least one computing device, cause the at least one computing device to perform operations comprising:

determining a state of a first device configured to output first video to a screen and first audio to one or more wireless speakers, wherein the one or more wireless speakers are configured to receive and output audio from an audio source different than from a video source from which the first video is received and output;

determining a priority list indicating an order in which audio from one or more devices, including both the first device and a second device, are output to the one or more wireless speakers, wherein the audio output from the one or more devices is received independently of the video;

detecting a change in the state of the first device;

selecting the second device as an audio source for the one or more wireless speakers based on both the change in the state of the first device and the priority list; and providing, based on the selected audio source, audio to the one or more wireless speakers for output, wherein the output audio corresponds to video output to the screen from the selected audio source.

16. The non-transitory computer-readable medium of claim 15, wherein the first device comprises a media player, and wherein one of the one or more other devices comprises a television including the screen, wherein both the media player and the television are configured to provide audio to the one or more wireless speakers.

17. The non-transitory computer-readable medium of claim 16, wherein a state of the media player indicates that video is being output to the television, and wherein the selected audio source comprises the media player.

18. The non-transitory computer-readable medium of claim 16, wherein a state of the media player indicates that no video is being output.

19. The non-transitory computer-readable medium of claim 18, wherein the operations further comprise:

determining that the media player has a greater priority than the television; and selecting the television as the audio source.

20. The method of claim 1, wherein the detecting the change in the state of the first device comprises:

detecting that the first device has been powered off.

21. The method of claim 20, further comprising:

switching to a default audio source responsive to the detecting that the first device has been powered off.

* * * * *